(12) United States Patent  
Parra et al.

(10) Patent No.: US 9,122,595 B2  
(45) Date of Patent: Sep. 1, 2015

(54) FAULT TOLERANCE FOR COMPLEX DISTRIBUTED COMPUTING OPERATIONS

(71) Applicant: NETSUITE INC., San Mateo, CA (US)

(72) Inventors: Ivan Omar Parra, Mountain View, CA (US); Douglas H. Williams, Capitola, CA (US)

(73) Assignee: NetSuite Inc., San Mateo, CA (US)

( * ) Notice: Subject to any disclaimer, the term of this patent is extended or adjusted under 35 U.S.C. 154(b) by 365 days.

(21) Appl. No.: 13/738,857

(22) Filed: Jan. 10, 2013

(65) Prior Publication Data

US 2013/0185603 A1 Jul. 18, 2013

Related U.S. Application Data

(60) Provisional application No. 61/586,472, filed on Jan. 13, 2012.

(51) Int. Cl.
*G06F 11/07* (2006.01)
*G06F 11/14* (2006.01)

(52) U.S. Cl.
CPC ........ *G06F 11/0709* (2013.01); *G06F 11/1438* (2013.01); *G06F 11/1446* (2013.01); *G06F 11/1482* (2013.01)

(58) Field of Classification Search
CPC ............ G06F 11/0709; G06F 11/1438; G06F 11/1446; G06F 11/1469; G06F 11/1471; G06F 11/1474; G06F 11/1482
See application file for complete search history.

(56) References Cited

U.S. PATENT DOCUMENTS

| 6,795,966 | B1 * | 9/2004 | Lim et al. ........................ 718/1 |
| 7,536,673 | B2 * | 5/2009 | Brendle et al. ................ 717/102 |
| 8,332,688 | B1 * | 12/2012 | Tompkins ....................... 714/13 |
| 2003/0233594 | A1 | 12/2003 | Earl |
| 2004/0153703 | A1 | 8/2004 | Vigue et al. |
| 2004/0193941 | A1 | 9/2004 | Barr et al. |
| 2008/0077605 | A1 * | 3/2008 | Vasu ............................. 707/101 |
| 2008/0086514 | A1 * | 4/2008 | Weissman et al. ............ 707/200 |
| 2008/0270838 | A1 | 10/2008 | Dorai et al. |
| 2012/0060165 | A1 * | 3/2012 | Clarke .......................... 718/104 |
| 2012/0089666 | A1 * | 4/2012 | Goswami et al. ............. 709/203 |
| 2013/0145371 | A1 * | 6/2013 | Brunswig et al. ............. 718/101 |

(Continued)

FOREIGN PATENT DOCUMENTS

WO WO9847070 A1 10/1998

OTHER PUBLICATIONS

"Notification of Transmittal of the International Search Report and Written Opinion of the International Searching Authority", Jun. 24, 2013, pp. 1-11, KIPO.

*Primary Examiner* — Marc Duncan
(74) *Attorney, Agent, or Firm* — Lane Powell PC

(57) ABSTRACT

A method for enabling a distributed computing system to tolerate system faults during the execution of a client process. The method includes instantiating an execution environment relating to the client process; executing instructions within the execution environment, the instructions causing the execution environment to issue further instructions to the distributing computing system, the further instructions relating to actions to be performed with respect to data stored on the distributed computing system. An object interface proxy receives the further instructions and monitors the received to determine if the execution environment is in a desired save-state condition; and, if so, save a current state of the execution environment in a data store.

20 Claims, 10 Drawing Sheets

(56) References Cited

U.S. PATENT DOCUMENTS

| | | | |
|---|---|---|---|
| 2013/0247035 A1* | 9/2013 | Khanna | 718/1 |
| 2014/0059209 A1* | 2/2014 | Alnoor | 709/224 |
| 2014/0310708 A1* | 10/2014 | Lim et al. | 718/1 |
| 2014/0331226 A1* | 11/2014 | Arcese et al. | 718/1 |
| 2015/0089274 A1* | 3/2015 | Mares et al. | 714/4.11 |

* cited by examiner

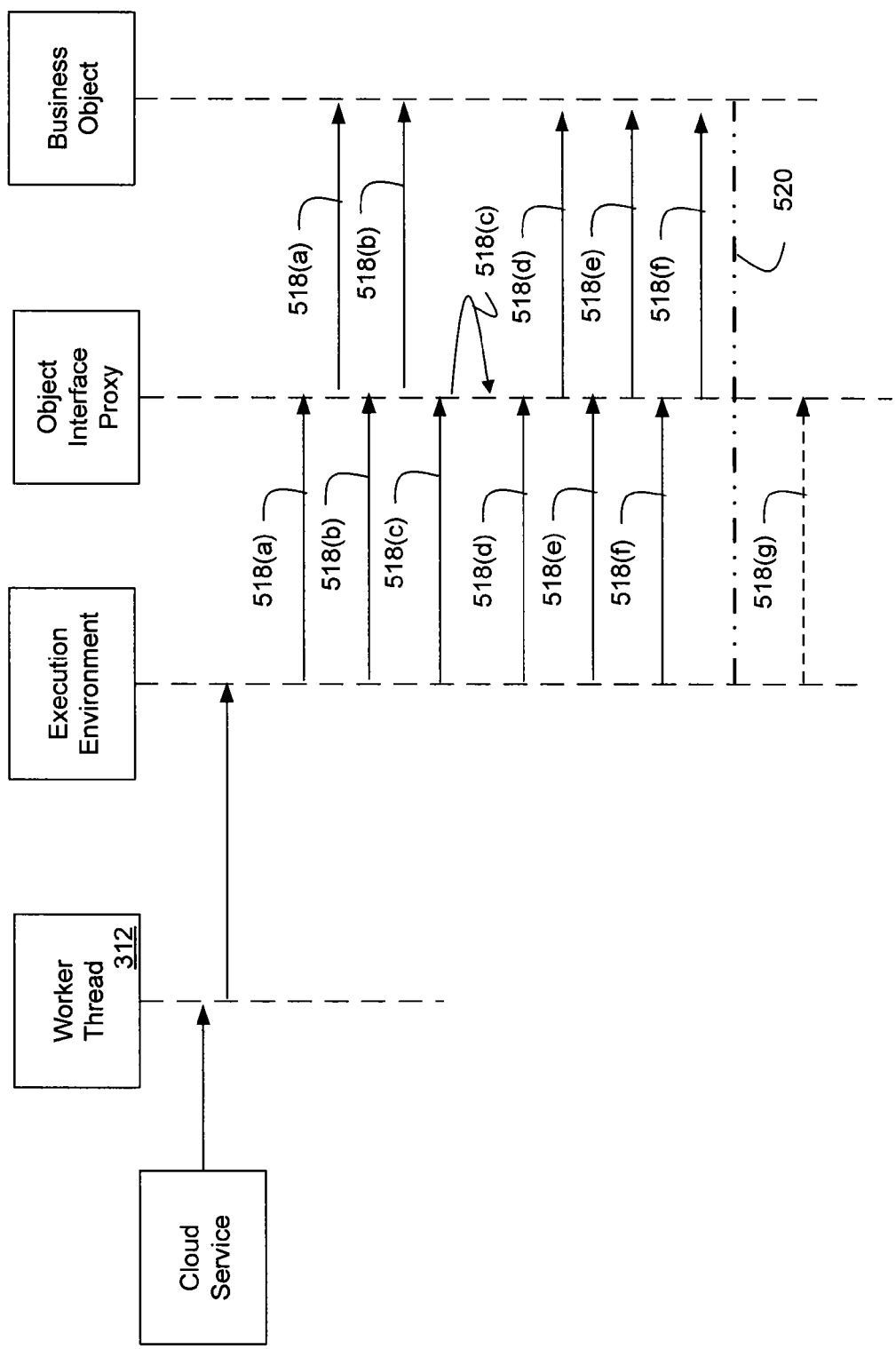

FAULT TOLERANCE FOR COMPLEX DISTRIBUTED COMPUTING OPERATIONS

CROSS-REFERENCE TO RELATED APPLICATIONS

This application claims the benefit of U.S. Provisional Patent Application No. 61/586,472, entitled "Fault Tolerance for Complex Distributed Computing Operations," filed on Jan. 13, 2012, which is incorporated by reference in its entirety herein for all purposes.

BACKGROUND

It has become commonplace to use computers, and networks of computers, to facilitate a wide variety of activities including work and recreation. Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

Cloud service platforms vary in the types of services they provide and the types of applications they are intended to support. At one end of the spectrum are "low level" services, such as platforms that provide access to the operating system, one or more development frameworks, databases and other like facilities. A primary goal for these platforms is to reduce hardware and IT costs without otherwise restricting the application developer's choice of technical solution or application space. At the other end of the spectrum are platforms that provide facilities to create applications in the context of a preexisting application with a well-defined purpose. Such "high level" cloud services typically focus on one or more well-defined end user applications such as business applications. A goal of these platforms is to enable the creation of extensions to a core application. The services provided in this case are typically skewed toward the context of the embedding application and away from low-level services and choice of technical solution. Some high level cloud services provide an ability to customize and/or extend one or more of the end user applications they provide, however high level cloud services typically do not provide direct access to low level computing functions. This can be problematic with respect to fault tolerance, for example, maintenance of data and/or behavioral integrity after experiencing an unexpected or interrupting event such as a power or communications network failure, since conventional approaches typically use low level computing functions to implement fault tolerance.

FIG. 1 depicts aspects of an example computing environment 100 that may benefit from at least one embodiment of the invention. A variety of client applications (not shown) incorporating and/or incorporated into a variety of computing devices 104 may communicate with a multi-tenant distributed computing service 108 through one or more networks 112. Examples of suitable computing devices 104 include personal computers, server computers, desktop computers, laptop computers, notebook computers, personal digital assistants (PDAs), smart phones, cell phones, computers, and consumer electronics incorporating one or more computing device components such as one or more processors. Examples of suitable networks include networks including wired and wireless communication technologies, networks operating in accordance with any suitable networking and/or communication protocol, private intranets and/or the Internet.

The multi-tenant distributed computing service 108 may include multiple processing tiers including a user interface tier 116, an application tier 120 and a data storage tier 124. The user interface tier 116 may maintain multiple user interfaces 128 including graphical user interfaces and/or web-based interfaces. The user interfaces 128 may include a default user interface for the service, as well as one or more user interfaces customized by one or more tenants of the service. The default user interface may include components enabling tenants to maintain custom user interfaces and otherwise administer their participation in the service. Each tier may be implemented by a distributed set of computers and/or computer components including computer servers. The data storage tier 124 may include a core service data store 132 as well as a data store (or data stores) 136 for storing tenant data.

The application tier 120 of the multi-tenant distributed computing service 108 may provide application servers 140 for executing customizable and/or extendible end user applications. For example, the application tier may enable customization with a programmatic language such as a scripting language. Custom program code may be executed in a controlled execution environment instantiated 144 by the application servers 140. For example, custom scripts may be executed by a scripting language interpreter.

Conventional attempts to enable customization of high level cloud services, such as the multi-tenant distributed computing service shown in FIG. 1, while addressing fault tolerance issues are inefficient, ineffective and/or have undesirable side effects or other drawbacks.

For example, programs running under a conventional computer operating system can typically use low-level mechanisms provided by a database to ensure that data consistency is maintained in the presence of unexpected interruptions. For particularly long running processes, other mechanisms may be employed to track the progress of a program in order to support recovery from unexpected events such as power loss, network interruptions or other system failures. For example, a program performing a repeated operation on a homogenous list of data objects can encapsulate each identical operation in a database transaction and include information to indicate completion of each unit of work. If the process is interrupted, when the system restarts, the program can query for the unprocessed objects and resume without sacrificing consistency in the data.

A process running on a cloud-based platform may not, however, have access to the same low-level facilities available to one written directly on the operating system. On such a system, data consistency may only be guaranteed within a scope of one system-level data access operation, such as the read or write of a business object. Even in a case where a long-running process is built from multiple identical computational units, these units may include more than a single data access operation. This can leave the process vulnerable to data inconsistencies if an unexpected interruption occurs, not between computational units, but in the midst of a single computational unit.

Users of low-level platforms are in a position to manage consistency issues because they typically have access to facilities available to conventional (non-Cloud, on-premise, etc.) development environments. For example, the transactional nature of a relational database may be combined with an architecture that minimizes a number of operations performed in a single transaction as the basis for ensuring consistent, durable data state.

On high level platforms, however, a program may not have direct access to a database transaction. Instead, the underlying database transactions may be used to ensure consistency of data access to the higher level business objects that these platforms interact with. In order to create an atomic process that spans multiple high-level data access operations, these platforms may provide a restricted form of transaction management that spans a small number of accesses and/or impose further limits on the types of platform services that may be utilized during the transaction.

Such a high level platform, such as the multi-tenant distributed computing service shown in FIG. 1, may be susceptible to intermittent interruptions including system failure, a resource governance mechanism, planned system restart, and monitoring-initiated restart. Resource governance may include resource utilization tracking on a per tenant basis by the platform and resource utilization limitation in accordance with an agreement between the tenant and the platform service provider. However, advantageously to the service provider, interruptions need not be guaranteed to provide signals that allow a client process to safely shut down. Such interruptions can be classified as (i) those occurring during a data write operation and (ii) those occurring outside a data write operation. In the former case, interruptions occurring inside a data write operation may not leave a business object in an inconsistent state because they are protected by an underlying database transaction. However, during the latter type of interruption, data consistency between business objects may be lost.

Embodiments of the invention are directed toward solving these and other problems individually and collectively.

SUMMARY

This summary is a high-level overview of various aspects of the present methods and systems for enabling fault tolerance in a distributed computing system executing a client process and introduces some of the concepts that are further described in the Detailed Description section below. This summary is not intended to identify key or essential features of the claimed subject matter, nor is it intended to be used to determine the scope of the claimed subject matter.

Particularly, various aspects of the embodiments described below are directed to methods which may include the steps of instantiating an execution environment relating to said client process and executing instructions within said execution environment. The executed instructions in turn cause the execution environment to issue further instructions to the distributed computing system relating to actions to be performed with respect to data stored on the distributed computing system. Those instructions are received by an object interface proxy and at least one of the instructions is a save-state instruction, which causes the object interface proxy to save a current state of the execution environment in a data store.

Other aspects of the various embodiments described below are directed to systems which may include an execution environment instantiated on a distributed computing system; an object interface proxy having a fault tolerance module and also running on the distributed computing system; and a data store. The execution environment may execute instructions on at least one software object in accordance with a client process and the object interface proxy acts as an interface for routing those instructions from the execution environment to the software object. The fault tolerance module may receive a save state instruction from the execution environment, which will cause the fault tolerance module to save a current state of said execution environment to the data store.

Other aspects of the various embodiments described below are directed to methods which may include the steps of instantiating an execution environment relating to a client process running on a distributed computing system and executing instructions within the execution environment. The instructions cause the execution environment to issue further instructions relating to actions to be performed with respect to data stored on the distributed computing system. An object interface proxy receives and monitors those instructions and determines whether the execution environment is in a desired save-state condition. If so, the current state of the execution environment is saved to a data store.

Other aspects of the various embodiments described below are directed to systems which may include an execution environment instantiated on a distributed computing system; an object interface proxy having a fault tolerance module and also running on the distributed computing system; and a data store. The execution environment may execute instructions on at least one software object in accordance with a client process and the object interface proxy acts as an interface for routing those instructions from the execution environment to the software object. The fault tolerance module is configured to monitor each instruction received by the fault tolerance module and determine if execution of the instruction places the execution environment in a desired save-state condition and, if so, save the current state of the execution environment in the data store.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which:

FIGS. 5a and 5b are high-level process flow diagrams depicting aspects of save state and restore state operations in accordance with at least one alternative embodiment of the invention;

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, fault tolerance for complex distributed computing operations is enabled. The save state mechanism may persist the controlled execution environment, and the saved state may be restored should the controlled execution environment detect that an interruption has occurred. The save state mechanism may act responsive to an explicit "save state" call or message and/or when a suitable execution state is detected. Control over the save state mechanism may be exposed to custom program code developers, for example, with a programmatic interface.

In accordance with at least one embodiment of the invention, the platform provides access to platform functionality with business objects having programmatic interfaces (sometimes called application programming interfaces or APIs). In a distributed computing environment, such interfaces may be accessed, for example, with suitable function calls, remote function calls and/or messaging protocols. The platform may guarantee the integrity of individual interface element operations, but not necessarily complex and/or compound operations involving activation of multiple interface elements. A business object interface access monitor may act as a call router or proxy for such interface access. In addition, the monitor may incorporate the save state mechanism, and make it accessible with a programmatic interface, for example, having "save state" and "restore state" elements.

In accordance with at least one embodiment of the invention, a script interpreter may execute a script causing multiple atomic, simple and/or integral (collectively, "atomic") transactions with respect to a set of business objects. A monitor component may monitor script actions with respect to the set of business objects and may save states of the script interpreter and/or the business objects as a recovery point so that the script may be resumed at the recovery point in case the set of multiple atomic transactions is interrupted. The recovery points may be created responsive explicit instructions by the script and/or based at least in part on the monitored script action with respect to the business objects.

Figure 2:
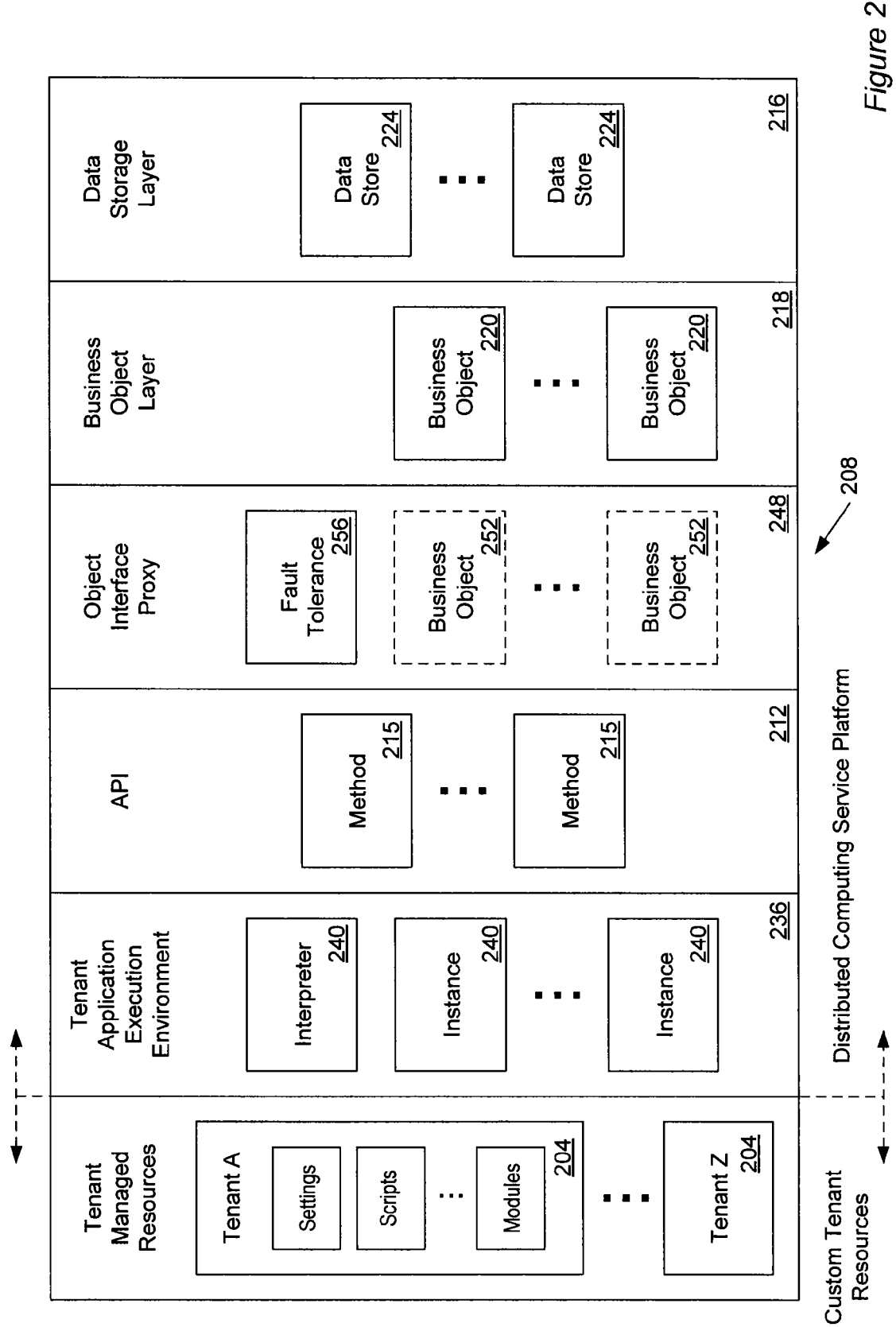
FIG. 2 is a schematic diagram depicting aspects of an example high level distributed computing service platform in accordance with at least one embodiment of the invention.
Figure 3:
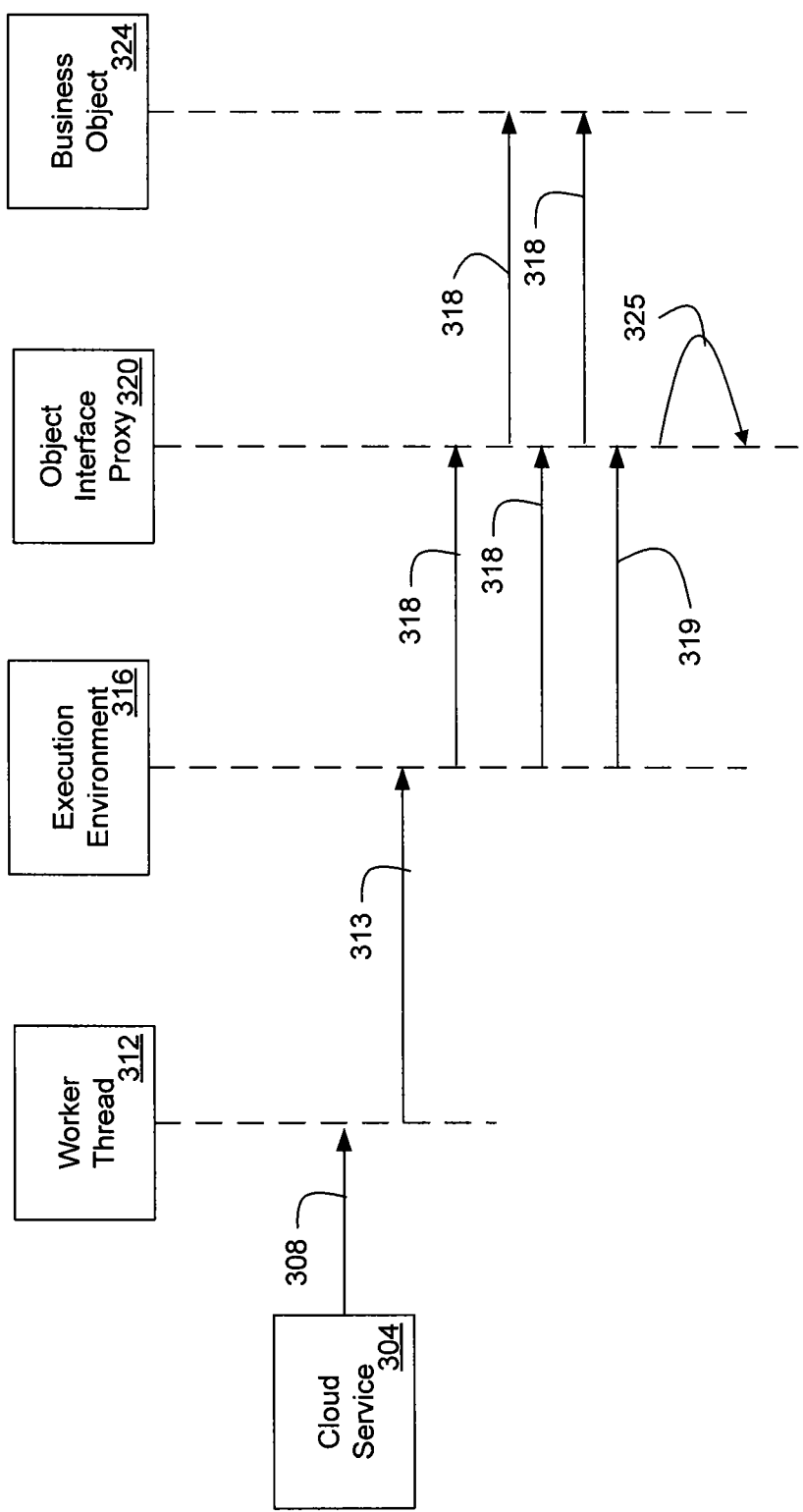
FIG. 3 is an interaction diagram depicting aspects of example interactions in accordance with at least one embodiment of the invention.

FIG. 2 depicts aspects of an example high level distributed computing service platform 200 in accordance with at least one embodiment of the invention. The platform may provide shared services and resources to enable client processes 204 to interact with an embedded, hosted, multi-tenant application 208. The client process 204 may interact with the embedded application 208 through an application programming interface (API) 212 that includes methods 215 to search, read and write data, methods to communicate with external systems and other utility methods for in process (non-data accessing) computations. Information exchange between the embedded application's data store 216 and the client process 204 may occur across the business object layer 218. For example, business objects 220 may correspond to multiple underlying database tables 224. Each data access operation provided by the API may advantageously have guaranteed integrity, for example, corresponding to the atomicity, consistency, isolation and durability (ACID) properties of database transactions. However, the platform 200 may be susceptible to intermittent interruptions including system failure, a resource governance mechanism, planned system restart, and monitoring-initiated restart.

The platform may provide a high level application 208, such as a business application, at least in part with a set of business objects 220 in the business object layer 218. The high level application 208 may be customized by tenants of the service with tenant managed resources including custom settings, custom program code such as scripts, custom program modules, and any suitable custom configuration components. Execution environments 236 may be instantiated for the custom program code and/or custom program modules. For example, where the custom program code includes code written using an interpreted programming language such as a scripting language, an interpreter 240 may instantiate execution environments 236 for scripts and/or associated tasks or jobs.

For example, the interpreter 240 may instantiate an execution environment 236 for a script. The interpreter 240 may then execute the script in the context of the instantiated execution environment 236. The script may cause one or more application messages (e.g., business object interface calls and/or messages) between the execution environment 236 and the business object layer 220 to be received and/or intercepted by an object interface proxy 248. The messages may then be routed to the appropriate business object 220 by the proxy 248.

The custom code running in the application execution environments 236 may access business object interfaces 252 through an object interface proxy 248. For example, the object interface proxy 248 may be a "thin proxy" that merely monitors remote functional calls and/or associated protocol messages (collectively "calls"), a load balancing or routing proxy that distributes call load, and/or a caching proxy. In accordance with exemplary embodiments of the present methods and systems, the object interface proxy 248 may further incorporate a fault tolerance module 256. For example, the fault tolerance module 256 may provide "save state" and "restore state" interface elements 260,264. Activation of the "save state" interface element 260 by program code in an application execution environment 236 may result in a restorable "snapshot" of the state of the execution environment being saved to a data store. Activation of the "restore state" interface element 260 with respect to an application execution environment 236 may result in the application execution environment being restored to a state corresponding to a previously saved "snapshot." As described below, the fault tolerance module 256 may further monitor calls to detect optimal and/or practical moments to save the state of application execution environment instances.

In accordance with at least one embodiment of the present methods and systems, the save state functionality of the object interface proxy 248 may capture the an inner state of a currently executing process, such as a script executing in an execution environment 236, by encapsulating all native calls made by the process to a thin API layer. For example, many scripting language interpreter engines include the native ability to capture a process' current execution state. In accordance with embodiments of the present methods and systems, this ability may be leveraged to serialize the binary data representing process' execution stack, including any residual data in both the interpreter and native to the application, and write it to a data store. Embodiments of the present methods and systems thus allow for both a preservation of the current execution state as well as a reliable recovery point in the event a failure occurs between API calls.

The layers and/or components of the distributed computing service platform may be implemented, at least in part, with data stores and/or computing resources (e.g., computer operating system resources) in a data storage layer and a computer operating system layer.

FIGS. 3-6 depict various aspects of example platform component interactions in accordance with at least one embodiment of the present methods and systems. A high level cloud service 304, such as the multi-tenant distributed computing service of FIG. 1 including the functionality described above in accordance with FIG. 2, may initiate a process, task, and/or job (collectively "process") 306 on an application server by sending an appropriate call, or command, 308 to the server, which may initiate a corresponding worker thread 312, representing a series of instructions executed by the server in order to perform the desired process 306. The process 306 may be associated and/or specified with a particular scripting language and the worker thread 312 may therefore execute a call 313 to instantiate an execution environment 316 via an interpreter engine to continue executing the process 306. Consequently, the process 306, via the execution environment 316, may make multiple calls 318, 319 to an object interface proxy 320, such as object interface proxy 248 described above in reference to FIG. 2. Each call represents an instruction to perform a discrete unit of work in the performance of the process 306. The calls 318 may, in turn, be forwarded and/or routed to one or more suitable and/or specified business objects 324, or, in the case of call 319, cause the object interface proxy 320 to perform in accordance with the functionality of its fault tolerance module 325.

The object interface proxy 320 may receive a save state call 319 instructing it to activate its "save state" functionality. Responsive to the save state call 319, the object interface proxy 320 may serialize the execution environment's current execution stack and its references (e.g., as maintained by the interpreter engine), and save the serialized binary data to a data store (not shown). Should an interruption and/or unexpected event be experienced, this serialized state can be restored once the high-level cloud service 304 can find a suitable execution environment.

FIG. 4 depicts an exemplary process that should have resulted in calls 418(a)-(f). However, the process experienced an interruption 420 following call 418(c), leading to the corruption of execution environment 426. Since call 418(c) was a save state call, the state of the execution environment was saved.

Figure 4A:
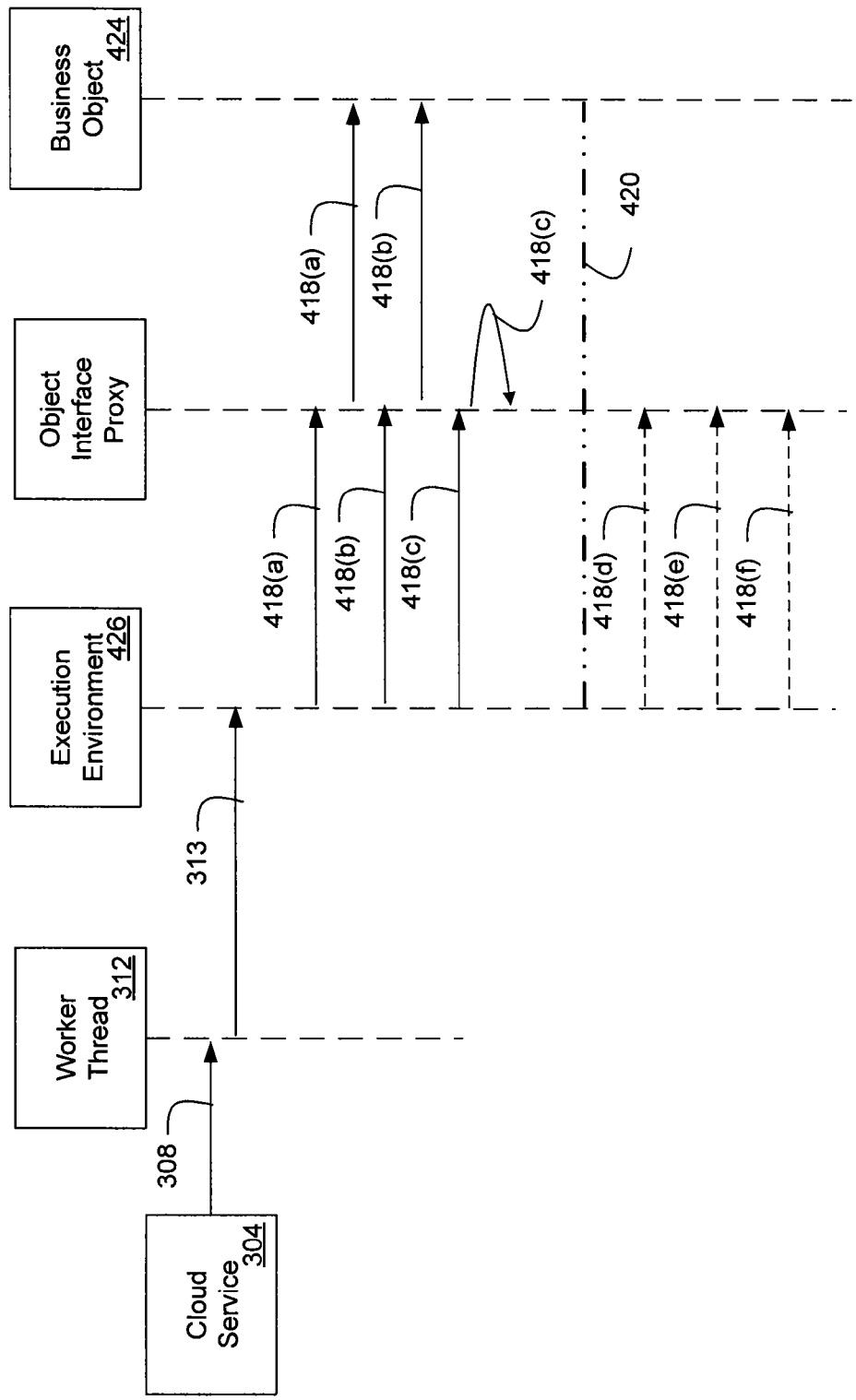
FIGS. 4a and 4b are high-level process flow diagrams depicting aspects of save state and restore state operations in accordance with at least one embodiment of the invention.
Figure 4B:
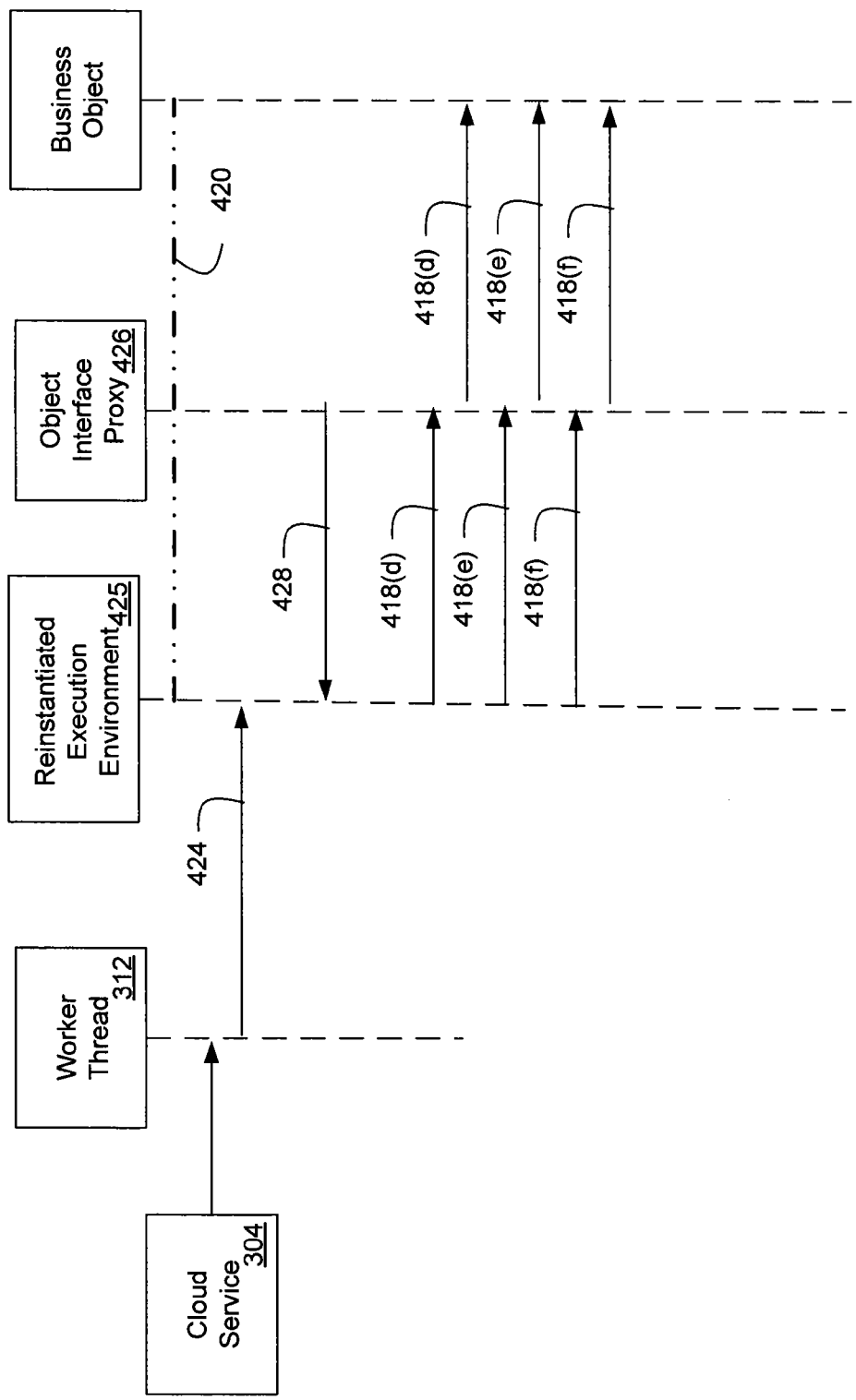

FIG. 4b depicts the interrupted process shown in FIG. 4a being resumed following the interruption. Since a saved execution environment state exists, the resumed process instructs the worker thread 312 to reinstantiate an execution environment 424. The object interface proxy 426 restores the reinstantiated execution environment 425 to the saved state 428 of the interrupted execution environment of FIG. 4a. The resumed process may continue as if there had not been an interruption, resulting in calls 418(d)-(f).

Figure 5B:
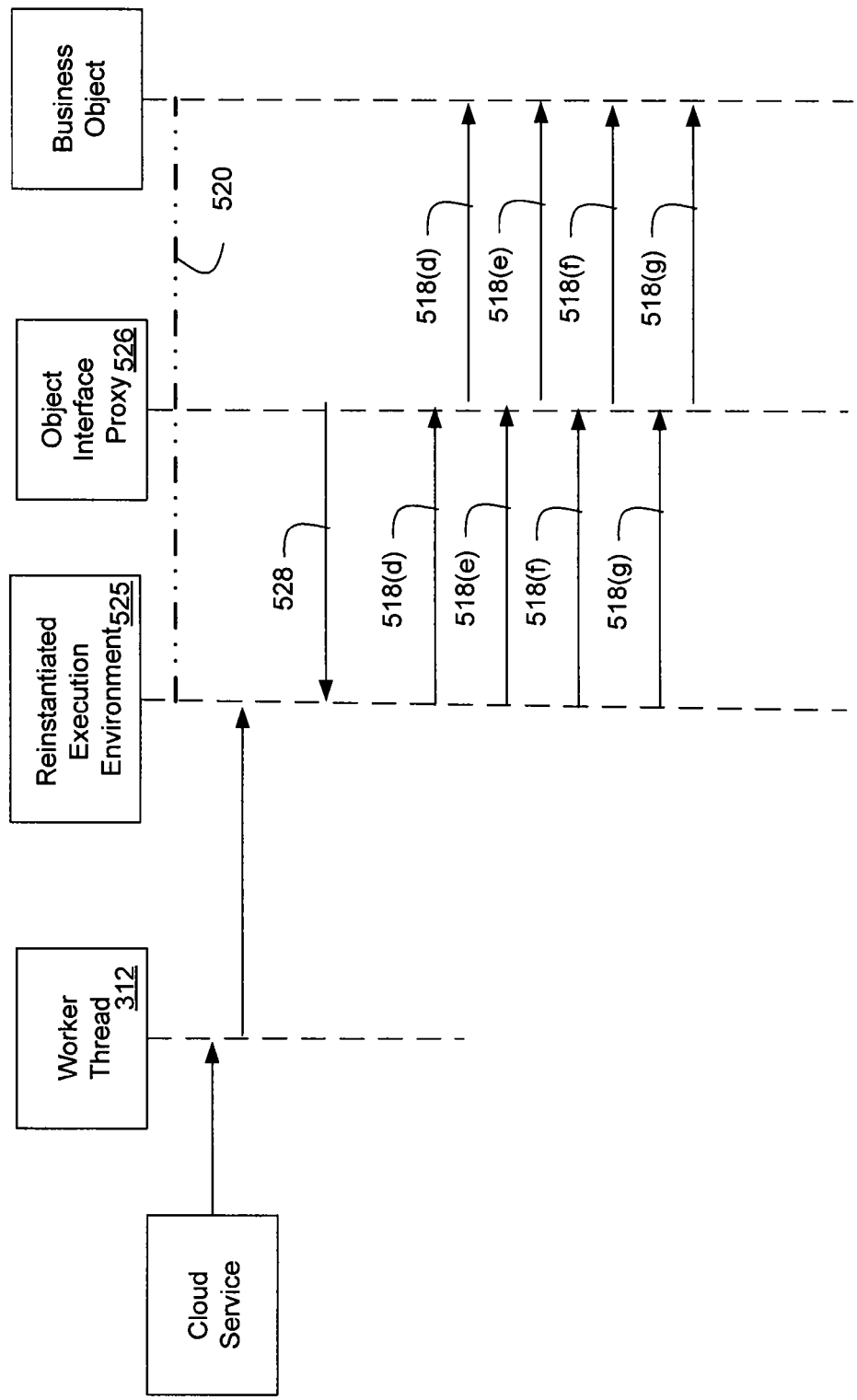

FIGS. 5a and 5b depict another example. As shown in FIG. 5a, the process should result in calls 518(a)-(g); however it is interrupted 520 following call 518(f). The most recent save state call was call 518(c). As shown in FIG. 5b, since a saved execution environment state exists, the resumed process instructs the worker thread 312 to reinstantiate the execution environment 525. The object interface proxy 526 restores the reinstantiated execution environment 425 to the saved state 528 of the interrupted execution environment of FIG. 5a. The resumed process then continues from the restore point, resulting in calls 518(d)-(g).

FIGS. 4a-b and 5a-b depict a save state call that is explicitly made by the executing process. For example, a script being executed by the interpreter engine may include scripting language statements that cause the save state call. Alternatively, or in addition, the object interface proxy may automatically save the execution environment state based at least in part by independently monitory the calls caused by the execution environment.

Figure 6:
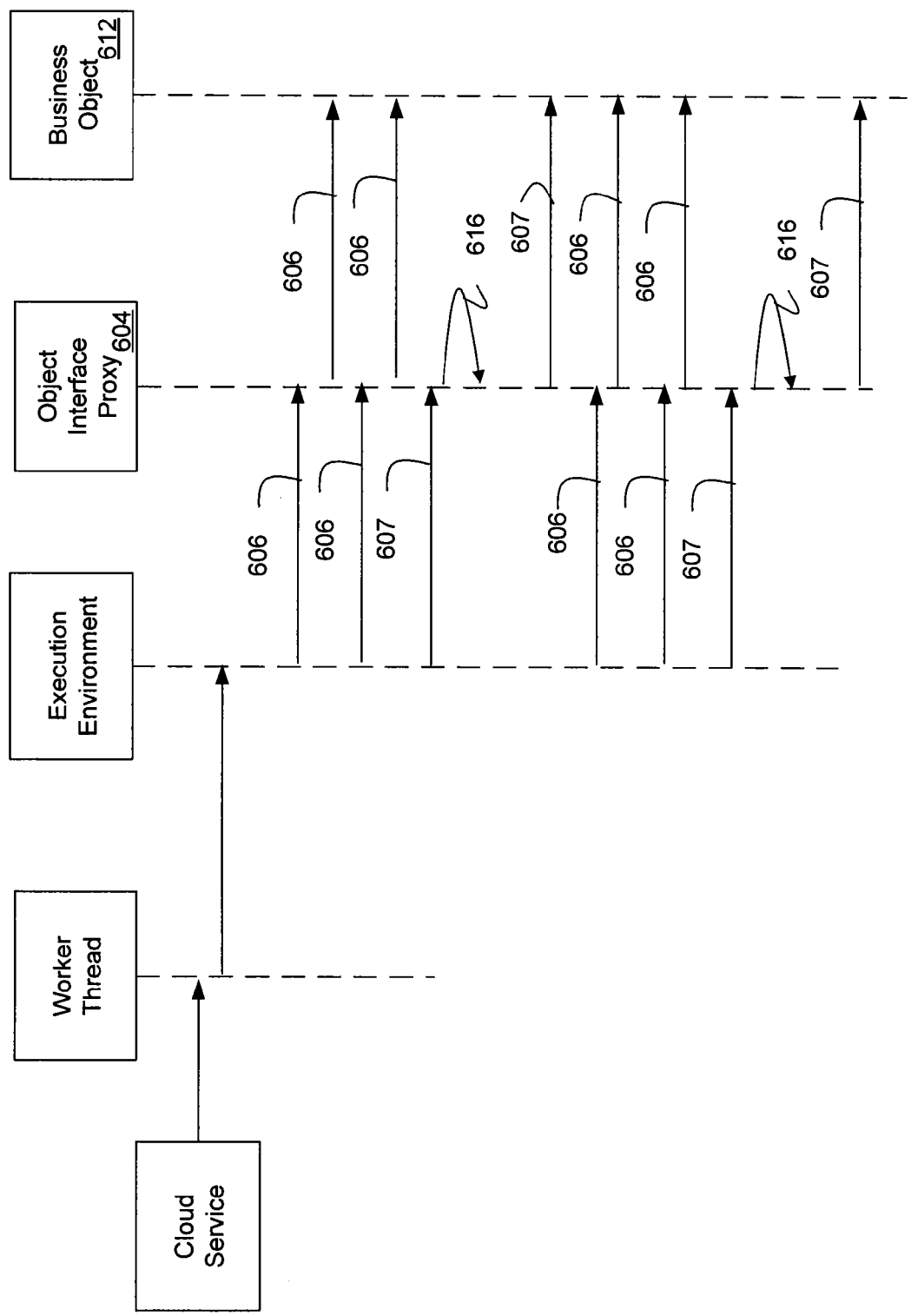
FIG. 6 is a high-level process flow diagram depicting aspects of save state and restore state operations in accordance with at least one alternative embodiment of the invention.

FIG. 6 depicts an example in accordance with the present methods and systems wherein the object interface proxy 604 routes a series of calls 606, 607 which may be calls relating only to data-read operations, e.g. calls 606, or calls relating to data-write operations, e.g. calls 607, from the execution environment 608 to appropriate business objects 612. The object interface proxy may accordingly monitor the calls 606, 607 and independently perform a save state operation 616 to save the state of the execution environment 608 following each of a particular type of call, such as the calls 607 relating to data-write operations. The object interface proxy 604 make save state decisions based on any suitable attribute of a monitored call and/or a monitored set of calls including call type, call volume, call frequency, call pattern and call parameters. Such automatic state saving can yield higher data integrity, less coding maintenance and/or a cleaner level of abstraction at a cost of some performance.

Figure 1:
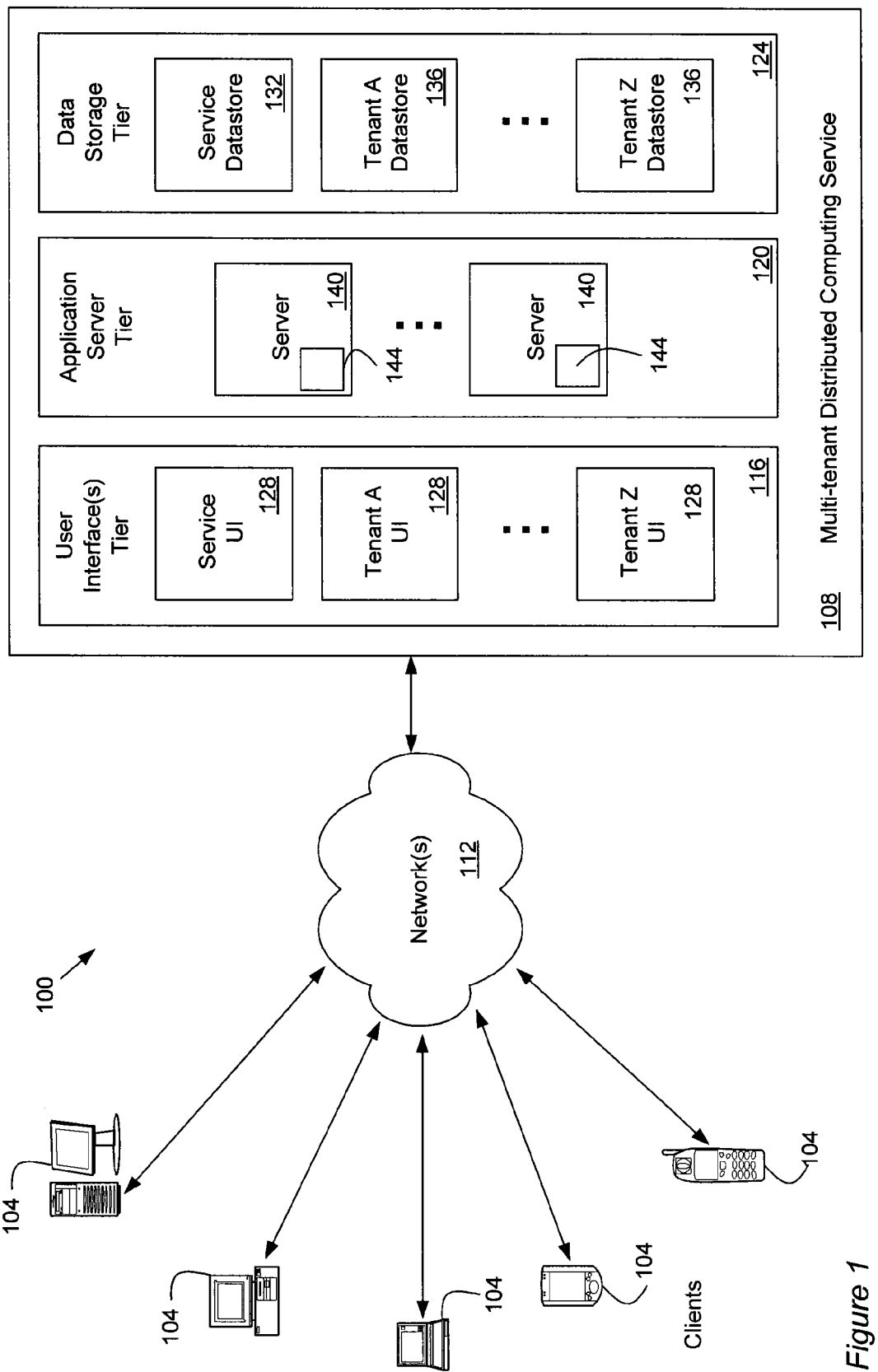
FIG. 1 is a schematic diagram depicting aspects of an example computing environment in accordance with at least one embodiment of the invention.
Figure 7:
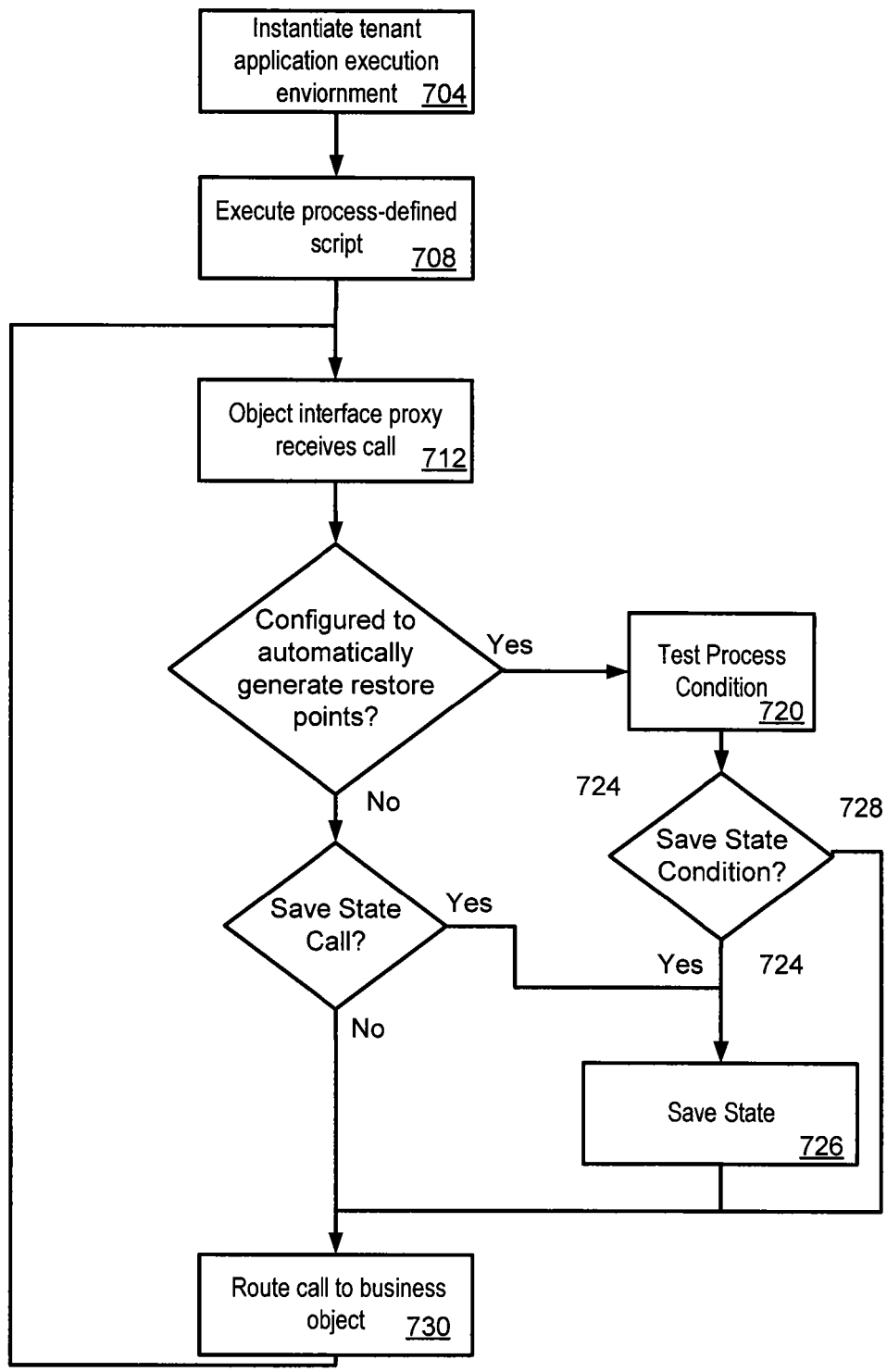
FIG. 7 is a flowchart depicting example steps for fault tolerance in accordance with at least one embodiment of the invention.

FIG. 7 depicts example steps 700 for enabling fault tolerance in a high-level cloud service, such as the multi-tenant distributed computing service of FIG. 1, in accordance with exemplary embodiments of the present methods and systems, such as shown and described in relation to FIG. 2. For a particular process, a tenant application execution environment may be instantiated 704. For example, the interpreter may instantiate an execution environment for a script as described above. The interpreter may then execute the script 708 in the context of the instantiated execution environment. The script may make one or more business object calls 712 to an object interface proxy and the messages may be routed 716 to the appropriate business object by the proxy.

If the object interface proxy is configured to create automatic restoration points for the execution environment, as described with respect to FIG. 6, after receiving a call 712, the object interface proxy may test 720 the progress of the process to detecting a save state condition. If a save state condition is detected 724, the procedure may progress to saving 726 (e.g., persisting) the current state of the execution environment. The save state operation may be performed prior to routing the call which triggered it, or in parallel therewith. If a save state condition is not detected 728, the object interface proxy may proceed to receiving and routing the next business object call. If the proxy is not configured to create automatic restoration points, as depicted in FIGS. 4a-5b, (e.g., for performance reasons), the execution environment state may be saved 726 in response to explicit "set restore point" messages. The object interface proxy then routes the next call to the appropriate business object and processes the next call 730.

The various aspects and embodiments described above are specific but not exclusive examples of how the present methods and systems may be implemented and the advantages gained therefrom. However, persons having ordinary skill in the art will recognize that the teachings present methods and systems are equally applicable to other embodiments and/or may be similarly described using alternate terminology. For example, the above description of the fault tolerance module of the object interface proxy can equally apply to any process running on a distributed computing system that monitors, routes, or otherwise tracks the interaction between various other software elements running on the system, tracks the current state of one or more of those elements, or their number, type, frequency, etc., and causes the state of one or more of those software elements to be saved, or otherwise 'backed up,' in response to a specific instruction from one of the software elements or in accordance predefined rule set. In the event of a fault or other interruption to normal operation, the most recently saved state (or states) can be restored and operation of the various software elements can continue from that point, rather than having to start over completely.

Figure 8:
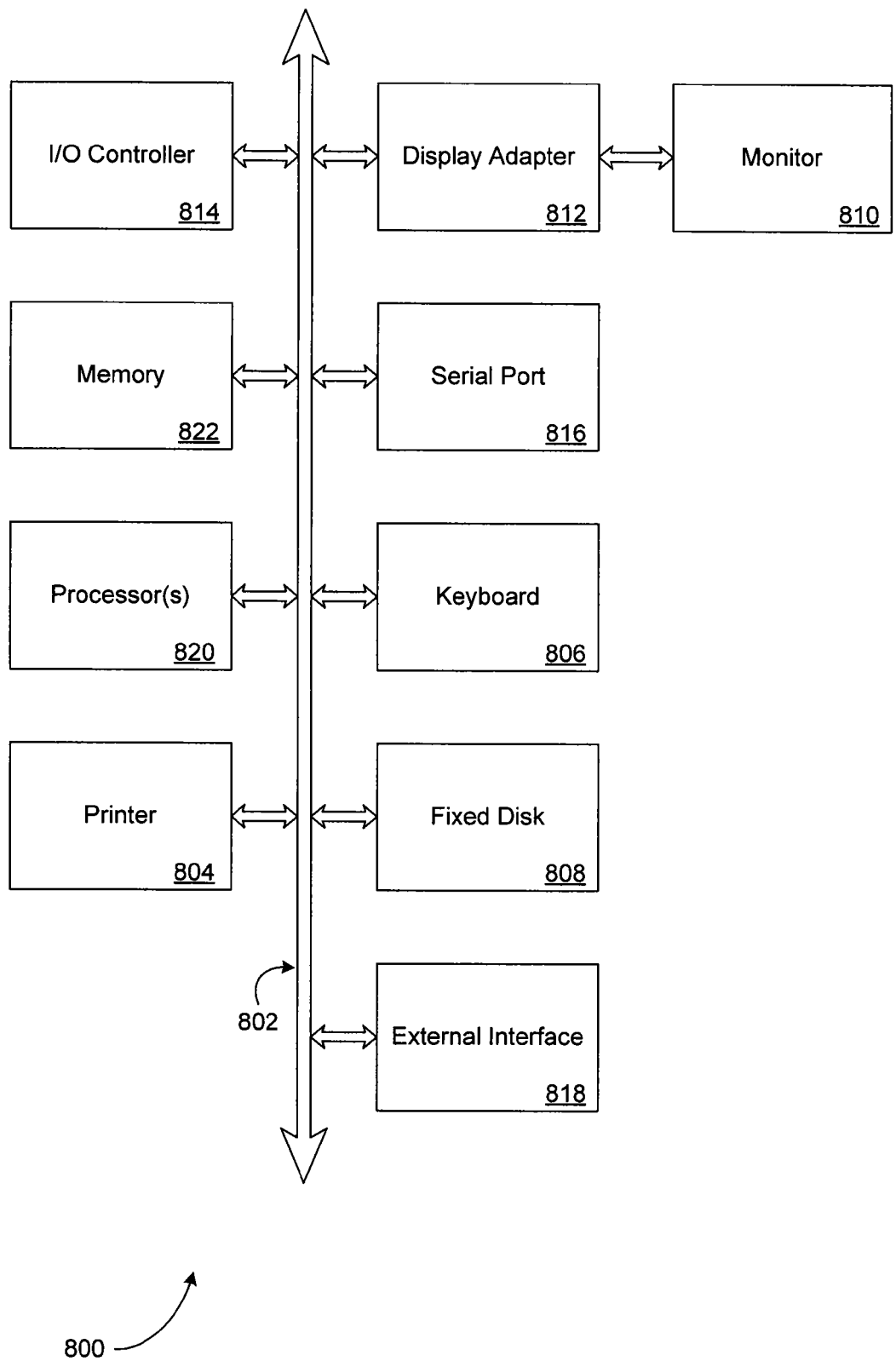
FIG. 8 is a schematic diagram depicting aspects of an example computer in accordance with at least one embodiments of the invention.

By way of a non-limiting example, FIG. 8 depicts aspects of elements that may be present in an exemplary computer architecture 800 which may be configured to implement at least some embodiments of the present methods and systems. The architecture 800 includes subsystems interconnected via a system bus 802. The subsystems may include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a universal serial bus (USB) port 816. For example, the USB port 816 or an external interface 818 can be utilized to connect the computer device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present methods and systems as described above can be implemented in the form of control logic using computer software in a modular or integrated manner. Based on the disclosure and teachings provided herein, a person of ordinary skill in the art will know and appreciate other ways and/or methods to implement the present methods and systems using hardware and a combination of hardware and software.

Any of the software components, processes or functions described in this application may be implemented as software code to be executed by a processor using any suitable computer language such as, for example, Java, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Exemplary embodiments of the present methods and systems have been described in detail above and in the accompanying figures for illustrative purposes. However, the scope of the present methods and systems are defined by the claims below and are not limited to the embodiments described above or depicted in the figures. Embodiments differing from those described and shown herein, but still within the scope of the defined methods and/or systems are envisioned by the inventors and will be apparent to persons having ordinary skill in the relevant art in view of this specification as a whole. The inventors intend for the defined methods and/or systems to be practiced other than as explicitly described herein. Accordingly, the defined methods and systems encompass all modifications and equivalents of the subject matter as permitted by applicable law.

That which is claimed is:

1. A method for enabling fault tolerance in a distributed computing system executing a client process, the method comprising:
   (a) instantiating an execution environment relating to said client process;
   (b) executing instructions within said execution environment, said instructions causing said execution environment to issue further instructions to said distributed computing system, said further instructions relating to actions to be performed with respect to data stored on said distributed computing system; and
   (c) receiving said further instructions by an object interface proxy, wherein at least one of said further instructions is a save-state instruction, which causes said object interface proxy to save a current state of said execution environment in a data store.

2. The method of claim 1, wherein said object interface proxy functions as an application programming interface for said distributed computing system.

3. The method of claim 1, further comprising the steps of:
   (d) determining a fault has occurred with said client process;
   (e) instantiating a new execution environment relating to said client process;
   (f) receiving a restore-state instruction by an object interface proxy indicating said client process has experienced said fault; and
   (g) in response to said restore-state instruction, retrieving said current state from said data store and placing said new execution environment in said current state.

4. The method of claim 3, wherein said object interface proxy functions as an application programming interface for said distributed computing system.

5. The method of claim 3, wherein any further instructions received subsequent to said save-state instruction that are performed by said distributed computing system prior to determining said fault has occurred are performed again after said new execution environment is placed in said current state.

6. A system for enabling a distributed computing system to tolerate system faults, the distributed computing system executing a client process, the system comprising:
 (a) a first execution environment instantiated on said distributed computing system and executing instructions on at least one software object in accordance with said client process;
 (b) an object interface proxy running on said distributed computing system and acting as an interface for routing instructions executed by said client process to said at least one software object and having a fault tolerance module; and
 (c) a data store for storing data relating to a state of said first execution environment; and
 wherein said fault tolerance module is configured to:
  (i) receive a save state instruction from said first execution environment, the receipt of which causes said fault tolerance module to save a current state of said first execution environment to said data store.

7. The system of claim 6, wherein said object interface proxy functions as an application programming interface for said distributed computing system.

8. The system of claim 6, wherein said fault tolerance module is further configured to:
 (ii) receive a restore-state instruction from a second execution environment, the receipt of which causes said fault tolerance module to place said second execution environment in said current state of said first execution environment.

9. The system of claim 8, wherein said object interface proxy functions as an application programming interface for said distributed computing system.

10. The system of claim 8, wherein any further instructions received subsequent to said save-state instruction that are performed by said distributed computing system prior to determining said fault has occurred are performed again after said second execution environment is placed in said current state.

11. A method for enabling a distributed computing system to tolerate system faults, the distributed computing system executing a client process, the method comprising:
 (a) instantiating an execution environment relating to said client process;
 (b) executing instructions within said execution environment, said instructions causing said execution environment to issue further instructions to said distributing computing system, said further instructions relating to actions to be performed with respect to data stored on said distributed computing system;
 (c) receiving said further instructions by an object interface proxy;
 (d) monitoring said received further instructions and determining if said execution environment is in a desired save-state condition; and
 (e) if said execution environment is in a desired save-state condition, saving a current state of said execution environment in a data store.

12. The method of claim 11, wherein step (d) includes determining a volume of further instructions received by said object interface proxy.

13. The method of claim 11, wherein step (d) includes determining a type of further instruction received by said object interface proxy.

14. The method of claim 13, wherein step (d) includes determining a frequency of said type of further instruction received by said object interface proxy.

15. The method of claim 11, wherein step (d) includes determining a sub-parameter of a further instruction received by said object interface proxy.

16. A system for enabling a distributed computing system to tolerate system faults, the distributed computing system executing a client process, the system comprising:
 (a) an execution environment instantiated on said distributed computing system and executing instructions on at least one software object in accordance with said client process;
 (b) an object interface proxy running on said distributed computing system and acting as an interface for routing said instructions executed by said client process to said at least one software object and having a fault tolerance module; and
 (c) a data store for storing data relating to a state of said execution environment; and
 wherein said fault tolerance module is configured to:
  (i) monitor said instructions and determine if said execution environment is in a desired save-state condition; and
  (ii) if said execution environment is in a desired save-state condition, save a current state of said execution environment in said data store.

17. The system of claim 16, wherein step (c) (i) includes determining a volume of further instructions received by said object interface proxy.

18. The system of claim 16, wherein step (c) (i) includes determining a type of further instruction received by said object interface proxy.

19. The system of claim 18, wherein step (c) (i) includes determining a frequency of said type of further instruction received by said object interface proxy.

20. The system of claim 16, wherein step (c) (i) includes determining a sub-parameter of a further instruction received by said object interface proxy.

* * * * *